United States Patent [19]

Calundann et al.

[11] Patent Number: 4,654,412

[45] Date of Patent: Mar. 31, 1987

[54] LINEAR, MELT PROCESSABLE, CROSSLINKABLE, THERMOTROPIC WHOLLY AROMATIC POLYESTERS AND CROSSLINKED POLYMERS PREPARED THEREFROM

[75] Inventors: Gordon W. Calundann, North Plainfield, N.J.; Husam A. A. Rasoul, Racine, Wis.; Henry K. Hall, Jr., Tuscon, Ariz.

[73] Assignee: Celanese Corporation, New York, N.Y.

[21] Appl. No.: 844,646

[22] Filed: Mar. 27, 1986

[51] Int. Cl.[4] .................... C08G 63/60; C08G 63/54; C08G 63/76

[52] U.S. Cl. .................................. 528/176; 528/183; 528/184; 528/190; 528/191; 528/192; 528/194; 525/445

[58] Field of Search ............... 528/176, 183, 184, 190, 528/191, 192, 194; 525/445

[56] References Cited

U.S. PATENT DOCUMENTS

| | | | |
|---|---|---|---|
| 4,118,372 | 10/1978 | Schaefgen | 528/190 |
| 4,230,817 | 10/1980 | Charbonneau | 528/206 |
| 4,276,407 | 6/1981 | Bilow et al. | 528/172 |
| 4,420,607 | 12/1983 | Morris et al. | 528/298 |

*Primary Examiner*—Lucille M. Phynes
*Attorney, Agent, or Firm*—Thomas J. Morgan

[57] ABSTRACT

Linear, melt processable, crosslinkable, thermotropic wholly aromatic ("liquid crystal") polyesters are prepared by polymerizing difunctional stilbene or tolan derivatives as comonomers with non-ethylenically and non-acetylenically unsaturated aromatic diols, dicarboxylic acids, hydroxy acids or reactive derivatives thereof. Shaped structures made from these polyesters are crosslinked using electron-poor monomers, such as maleic anhydride.

19 Claims, No Drawings

LINEAR, MELT PROCESSABLE, CROSSLINKABLE, THERMOTROPIC WHOLLY AROMATIC POLYESTERS AND CROSSLINKED POLYMERS PREPARED THEREFROM

BACKGROUND OF THE INVENTION

1. Field of the Invention

This invention relates to linear, melt processable, crosslinkable, thermotropic wholly aromatic polyesters, to methods of crosslinking such polyesters, to the thus-prepared crosslinked polymers, and to high performance products, such as moldable and extrudable resins, shaped structures, including molded objects, fibers and films, and the like, which incorporate the invention.

2. Description of the Prior Art a. Wholly Aromatic Polyesters

Linear "wholly aromatic" polyesters, so called because each of their constituent monomers—aromatic diacids, aromatic diols and, on occasion, hydroxyaromatic acids—contributes at least one aromatic ring to the polymer backbone, sometimes referred to as "liquid crystal" polyesters, and various methods for their preparation, have become well known in the art. See, for example, U.S. Pat. No. 4,393,191, issued July 12, 1983 to East and assigned to Celanese Corporation, which contains a copious disclosure of such linear polyesters and methods for their preparation.

As mentioned in the East patent, a considerable advance was made in such polyesters when it was discovered that by a proper choice of monomers linear, wholly aromatic polyesters could be prepared which readily exhibit melt anisotrophy. The formation of an anisotropic melt phase, in turn, permits such polyesters to undergo melt processing to form shaped structures such as molded articles and fibers.

U.S. Pat. No. 4,417,043 discloses polymers, including polyesters, capable of forming an anisotropic melt which include, as part of the polymer chain, self-crosslinking reactants. In the case of the polyesters disclosed, the patent mentions tri- or higher-functional monomeric and polymeric self-crosslinking reactants containing at least three reactive hydroxyl, carboxyl, amino, isocyanate or carbodiimide groups, or combinations thereof. Also mentioned are maleic, fumaric and itaconic acids and their mono- and diesters, but only for use as self-crosslinking reactants in polymers prepared by addition polymerization of monoethylenically unsaturated materials. In all such crosslinkable polymers, crosslinking takes place in the melt. Thus, no more than relatively small amounts of self-crosslinking reactants must be used when preparing crosslinking polymers by the '043 patent's methods to avoid crosslinking the melt to an intractable, unprocessable solid.

b. Polyesters Containing Stilbene and Tolan Derivatives

Various stilbene and tolan (diphenylethyne) derivative-containing polyesters, none of them, however, being linear, melt processable thermotropic, wholly aromatic polyesters, are disclosed in the prior art.

U.S. Pat. No. 2,657,195, for example, discloses linear polyesters obtained by reacting a stilbene dicarboxylic acid compound, such as p,p'-stilbene dicarboxylic acid, and at least one difunctional glycol, diamine or amino alcohol containing an alkylene, cycloalkylene, arylene or aralkylene radical of from about 2 to 16 carbon atoms. Part of the stilbene dicarboxylic acid can be replaced with a dibasic acid compound other than a stilbene dicarboxylic acid, and the polyesters produced can, according to the patentee, be altered in their character " . . . either before or after polymer formation, by reaction with compounds capable of adding to a double bond." The addition of bromine or other halogens, hydrogen halides, hypohalites and organic acids across the double bond, hydroxylation with hydrogen peroxide or potassium permanganate, reaction with maleic anhydride and "crosslinking by known means, such as vulcanization" are all disclosed as examples of such possible alterations. U.S. Pat. No. 2,697,194 contains a similar disclosure, but is restricted to the use of polyalkylene glycols whose alkylene radicals contain from 2 to 6 carbon atoms, such as diethylene and triethylene glycol, as the diol constituents of its polyesters.

U.S. Pat. No. 4,073,777 discloses radiation crosslinkable, water dispersible polyesters containing, as part of their diacid content, an α,β-unsaturated acid of the structure:

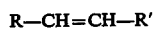

in which R can be arylcarboxy and R' can be carboxy or arylcarboxy, such as 4,4'-dicarboxystilbene. From 0 to about 80 mol percent of a hydroxycarboxylic acid, 4-carboxycinnamic acid, can also be present.

U.S. Pat. No. 2,856,384 discloses aromatic diacid/aliphatic diol polyesters which include moities derived from 4,4'-dicarboxytolan, with or without small amounts of the 4,3'- and 3,3'-isomers.

U.S. Pat. No. 4,245,084 discloses thermotropic, wholly aromatic polythiolesters which exhibit an anisotropic melt and which can have, as part of their polymer chains, the moiety:

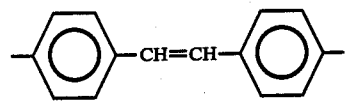

U.S. Pat. No. 4,420,607 relates to high molecular weight copolyesters comprising repeating units from trans-4,4'-stilbenedicarboxylic acid, 0–40 mol % terephthalic acid or 2,6-naphthalenedicarboxylic acid, and 1,2-propanediol. Earlier patents disclosing stilbenedicarboxylic acid-containing polyesters are mentioned as well.

Linear, melt processable, thermotropic, wholly aromatic polyesters differ greatly in their morphology or polymer structure from aliphatic-aromatic or all-aliphatic polyesters. The all-aromatic polyesters in question are, when highly oriented, made up of closely packed polymer chains, as indicated by the high resistance to solvent swelling exhibited by structures, e.g., fibers, formed from such polyesters, and as determined by X-ray crystallography and orientation angle measurements carried out on such structures. Accordingly, such wholly aromatic polyesters would at best be expected to be difficulty crosslinkable if crosslinkable sites were built into the polymer chains for later reaction with external crosslinking agents, as has been done with aliphatic-aromatic and all-aliphatic polyesters, since such external crosslinking agents would be expected to have marginal penetration into such closely-packed structures. Indeed, this fact is underscored by the disclosure of U.S. Pat. No. 4,417,043, whose method of rendering all-aromatic polyesters crosslinkable has, as mentioned, certain inherent deficiencies.

It is, therefore, an object of the present invention to provide novel linear, melt processable, crosslinkable, thermotropic, wholly aromatic polyesters.

It is also an object of the present invention to provide methods of crosslinking such novel linear, melt processable, crosslinkable, thermotropic, wholly aromatic polyesters to produce novel high performance products.

A further object of the present invention is to provide novel linear, melt processable crosslinkable, wholly aromatic polyesters which can first be formed into shaped structures, with no processing problems arising from crosslinking during processing of the melt from which such structures are formed, and then crosslinked to any desired extent.

These and other objects, as well as the nature, scope and utilization of the invention, will become readily apparent to those skilled in the art from the following description and the appended claims.

SUMMARY OF THE INVENTION

It has now been discovered that novel linear, melt processable, crosslinkable, thermotropic, wholly aromatic polyesters can be prepared by polymerizing difunctional stilbene or tolan derivatives with non-ethylenically and non-acetylenically unsaturated aromatic diols, dicarboxylic acids, hydroxy acids or reactive derivatives thereof. The stilbene and tolan derivatives employed include dicarboxy, dihydroxy and hydroxy-carboxy stilbenes and tolans, and reactive derivatives thereof, as well as difunctional derivatives of cinnamic acid containing two carboxyl groups or a carboxyl group and a ring hydroxyl group, and reactive derivatives thereof. It has also been discovered, quite unexpectedly, that such polyesters, which are resistant to swelling by solvents and uncrosslinkable by radiation or by multifunctional acrylates such as glyceryl triacrylate, pentaerythritol triacrylate, or the like, can readily be crosslinked with substances which can be characterized as electron-poor or electron-accepting monomers, such as maleic, fumaric and itaconic acids, maleic anhydride, and the like.

DETAILED DESCRIPTION OF THE INVENTION

The difunctional stilbene and tolan derivatives usuable when practicing the present invention include the difunctional monomers represented by the general formulas:

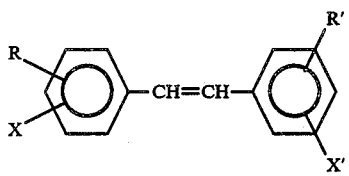

and

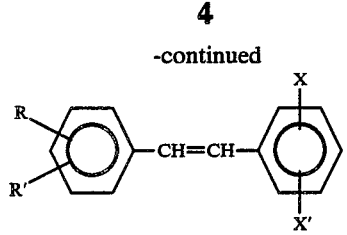

in the case of stilbene derivatives, any by the general formulas:

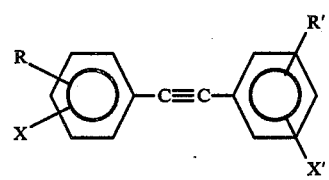

and

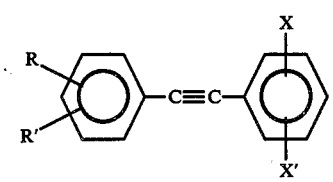

in the case of tolan derivatives.

In these formulas X and X' can be the same or different, and will be a hydroxyl group, a carboxyl group, or a reactive derivative thereof, e.g., a lower acyloxy, e.g., acetoxy, propionoxy or butyroxy group, or an esterified carboxyl group, e.g., a carboxyl group esterified with a lower aliphatic, cycloaliphatic or aromatic alcohol, such as methanol, ethanol, cyclohexanol, phenol or benzyl alcohol. Similarly, R and R' can be the same or different ring substituent which will not interfere substantially with the polymerization reaction, such as hydrogen, a lower alkyl group, preferably one containing from 1 to 4 carbon atoms such as methyl, ethyl or t-butyl, an aryl group, preferably one containing from 6 to 10 carbon atoms such as phenyl or naphthyl, a lower alkoxy group, e.g., methoxy, ethoxy or t-butoxy, an aryloxy group, e.g., phenoxy or benzyloxy, halogen, i.e., a fluoro, chloro, bromo or iodo substituent.

Included among such stilbene and tolan derivatives are 4,4'-stilbenedicarboxylic acid; 4,3'-stilbenedicarboxylic acid; 3,3'-stilbenedicarboxylic acid; 2,5-stilbenedicarboxylic acid; 3,5-stilbenedicarboxylic acid; 4,4'-dihydroxystilbene; 4,3'-dihydroxystilbene; 3,3'-dihydroxystilbene; 2,2'-dihydroxystilbene; 3,5-dihydroxystilbene; 4-carboxy-4'-hydroxystilbene; 4-carboxy-3'-hydroxystilbene; 4-acetoxy-4'-carboxystilbene; 4,4'-dicarboxytolan; 4,3'-dicarboxytolan; 4,4'-dihydroxytolan; 4-carboxy-4'-hydroxytolan; 4-carboxy-3'-hydroxytolan; 4-acetoxy-4'-carboxytolan; 3,5-dicarboxytolan; 3,5dihydroxytolan, and the like, with the stilbene derivatives being in either their cis- or trans-forms.

The difunctional cinnamic acid derivatives usable when practicing the present invention include the difunctional monomers represented by the general formula:

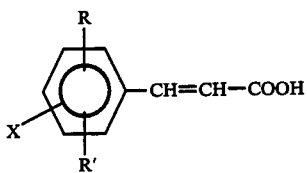 (V)

In this formula X, R and R' have the same meanings as given above for formulas I–IV.

Included among such cinnamic acid derivatives are: 2-hydroxycinnamic acid; 3-hydroxycinnamic acid; 4-hydroxycinnamic acid; 4-hydroxy-3-methoxycinnamic acid; 3,5-dimethoxy-4-hydroxycinnamic acid; 2-carboxycinnamic acid; 3-carboxycinnamic acid; 4-carboxycinnamic acid, and the like, with these cinnamic acid derivatives being in either their cis- or trans- forms.

The crosslinked polyesters of the present invention are prepared by polymerizing one or more of the foregoing difunctional, carbon-to-carbon double or triple bond-containing unsaturated monomers with one or more aromatic dicarboxylic acids, aromatic diols or hydroxyaromatic acids which contain no ethylenic or acetylenic unsaturation and contribute to the resulting crosslinkable liquid crystal polymer one or more of the following recurring units:

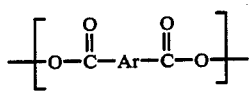 (VI)

 (VII)

and

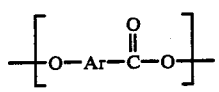 (VIII)

in which Ar can represent an unsubstituted or substituted aromatic moiety such as:

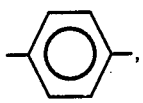,

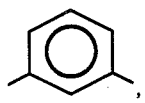,

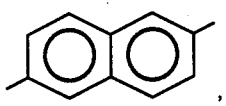,

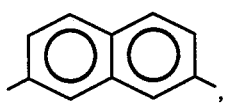,

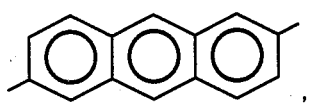,

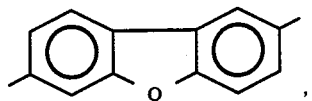,

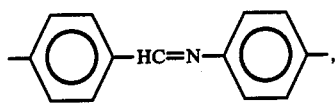,

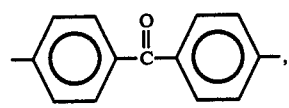,

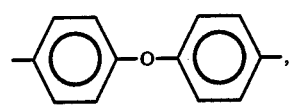,

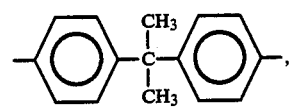,

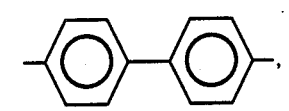,

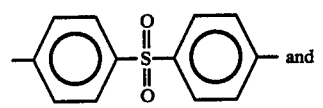 and

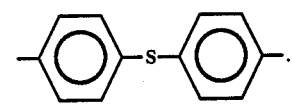.

Included among such comonomers are aromatic dicarboxylic acids and esters thereof such as isophthalic acid, terephthalic acid, dimethyl terephthalate, 2,6-dicarboxynaphthalene, 4,4'-oxydibenzoic acid, 4,4'-dicarboxybiphenyl, and the like, aromatic diols such as hydroquinone, hydroquinone diacetate, 4,4'-dihydroxydiphenyl, 4,4'-dihydroxybenzophenone, 2,6'-dihydroxynaphthalene, 4,4'-dihydroxydiphenyl ether, and the like, and hydroxyaromatic acids such as 6-hydroxy-2-naphthoic acid, 7-hydroxy-2-naphthoic acid, 6-hydroxy-5-chloro-2-naphthoic acid, 6-hydroxy-5-methyl-2-naphthoic acid, 7-hydroxy-5-methoxy-2-naphthoic acid, 6-hydroxy-7-chloro-2-naphthoic acid, 6-hydroxy-4,7-dichloro-2-naphthoic acid, 4-hydroxybenzoic acid, 3-chloro-4hydroxybenzoic acid, 2-chloro-4-hydroxybenzoic acid, 3,5-dichloro-4-hydroxybenzoic acid, 2,5-dichloro-4-hydroxybenzoic acid, 3-bromo-4-hydroxybenzoic acid, 3-methyl-4-hydroxybenzoic acid, 3,5-dimethyl-4-hydroxybenzoic acid, 2,6-dimethyl-4hydroxybenzoic acid, 3-methoxy-4-hydroxybenzoic acid, 3,5-dimethoxy-4-hydroxybenzoic acid, and the like.

At least about 1 mol %, e.g., from about 2 to about 80 mol % of the total aromatic dicarboxylic acid, aromatic diol or hydroxyaromatic acid content of the linear, crosslinkable all-aromatic polyester, and preferably from about 5 to about 30 mol %, based on the total mols of monomers used to prepare this linear polyester, can be represented by one or several of the above-described difunctional, carbon-to-carbon double or triple bond-containing unsaturated monomers such as 4,4'-stilbenedicarboxylic acid or the like. The total amount of aromatic dicarboxylic acid, aromatic diol and, if employed, hydroxyaromatic acid used to prepare a linear, crosslinkable all-aromatic polyester of this invention will result in there being approximately stoichiometrically equal amounts of hydroxyl and carboxyl groups available for reaction.

Particularly preferred linear, crosslinkable all-aromatic polyesters can be prepared from the following mixtures of difunctional, carbon-to-carbon double or triple bond-containing unsaturated monomers with difunctional aromatic comonomers containing no ethylenic or acetylenic unsaturation:

tively, molecular weight can be determined by applying light scattering techniques to a pentafluorophenol solution of the polymer, and such solutions can also be subjected to viscosity measurement and gel permeation chromatography. Polymer inherent viscosity will generally range from at least about 0.1 up to 9.0 dl/g, and preferably will be in the range of from about 5.0 to about 7.0 dl/g, as measured at 0.1% by weight concentration in pentafluorophenol solution at 60° C.

The crosslinkable wholly aromatic polyesters of this invention can readily be melt processed to provide various shaped articles, including molded three-dimensional articles, fibers and films. Thus, they can be molded using standard injection molding techniques, and it is not essential that severe injection molding conditions (such as high temperatures or long cycle times)

TABLE I

| ANA[1] | ACS[2] | CAT[3] | DCS/DHQ[4] | DCT/DHQ[5] | DAT/TA[6] | DAS/TA[7] | ACA[8] | CCA/DHQ[9] |
|---|---|---|---|---|---|---|---|---|
| 80–20[10] | 20–80 | — | — | — | — | — | — | — |
| 80–20 | — | 20–80 | — | — | — | — | — | — |
| 80–20 | — | — | 20–80 | — | — | — | — | — |
| 80–20 | — | — | — | 20–80 | — | — | — | — |
| 80–20 | — | — | — | — | 20–80 | — | — | — |
| 80–20 | — | — | — | — | — | 20–80 | — | — |
| 80–20 | — | — | — | — | — | — | 20–80 | — |
| 80–20 | — | — | — | — | — | — | — | 20–80 |

[1]6-Acetoxy-2-naphthoic acid.
[2]4-Acetoxy-4'-carboxystilbene.
[3]4-Acetoxy-4'-carboxytolan.
[4]Equimolar mixtures of 4,4'-dicarboxystilbene and diacetoxyhydroquinone (e.g., 10 mol % DCS, 10 mol % DHQ, based on the total mols of polymerizable monomers present, when 20 mol % DCS/DHQ is used).
[5]Equimolar mixtures of 4,4'-dicarboxytolan and diacetoxyhydroquinone.
[6]Equimolar mixtures of 4,4'-diacetoxytolan and terephthalic acid.
[7]Equimolar mixtures of 4,4'-diacetoxystilbene and terephthalic acid.
[8]4-Acetoxycinnamic acid.
[9]Equimolar mixtures of 4-carboxycinnamic acid and diacetoxyhydroquinone.
[10]All ranges are in mol percents.
[11]Diacetoxyhydroquinone=hydroquinone diacetate=1,4-diacetoxybenzene

TABLE II

| ANA/ABA[1] | ACS | CAT | DCS/DHQ | DCT/DHQ | DAT/TA | DAS/TA | ACA | CCA/DHQ |
|---|---|---|---|---|---|---|---|---|
| 98–50[2] | 2–50 | — | — | — | — | — | — | — |
| 98–50 | — | 2–50 | — | — | — | — | — | — |
| 98–50 | — | — | 2–50 | — | — | — | — | — |
| 98–50 | — | — | — | 2–50 | — | — | — | — |
| 98–50 | — | — | — | — | 2–50 | — | — | — |
| 98–50 | — | — | — | — | — | 2–50 | — | — |
| 98–50 | — | — | — | — | — | — | 2–50 | — |
| 98–50 | — | — | — | — | — | — | — | 2–50 |

[1]ABA = 4-acetoxybenzoic acid. The letters ANA, ACS, CAT, DCS, DHQ, DCT, DAT, TA, DAS, ACA and CCA designate the same monomers as in Table I. The numbers appearing under these designations are mol percents. Where two monomers other than ANA and ABA are listed together they are present in equimolar amounts, e.g., 1 mol % DCS, 1 mol % DHQ, based on the total mols of polymerizable monomers present, when 2 mol % DCS/DHQ is used.
[2]No more than 80 mol % of either ANA or ABA will be present in these mixtures.

Conventional melt polymerization conditions, such as those described, for example, in East U.S. Pat. No. 4,393,191; see from column 2, line 47 to column 3, line 6, from column 3, line 34 to column 4, line 20 and from column 5, line 29 to column 6, line 21, and in U.S. Pat. No. 4,130,545, issued Dec. 19, 1978 to Calundann; see from column 7, line 17 to column 9, line 9, can be used to prepare these linear, crosslinkable wholly aromatic polyesters. Polymerization will ordinarily be continued, taking care to avoid any substantial polymer degradation, until the desired molecular weight has been reached.

Preferably the crosslinkable polyesters of this invention will range in weight average molecular weight from about 5,000 to about 100,000, and preferably from about 10,000 to about 30,000, as determined by standard techniques which do not involve dissolving the polymer, such as end group determination using infrared spectroscopy on compression molded films. Alternaor techniques used with relatively intractable polymers (such as compression molding, impact molding or plasma spraying) be employed.

When forming fibers and films the extrusion orifice may be any of those commonly utilized for melt extrusion. For instance, the shaped extrusion orifice may be in the form of a rectangular slit when forming a polymeric film. When forming a filamentary material the spinneret selected may contain one and preferably a plurality of extrusion orifices. A standard conical spinneret containing 1 to 200 holes (e.g., 6 to 200 holes) such as is commonly used in the melt spinning of polyethylene terephthalate, having a diameter of about 5 to 60 mils (e.g., 10 to 40 mils) may be utilized. Yarns of about 20 to 36 continuous filaments are commonly formed. The melt spinnable crosslinkable wholly aromatic polyester is supplied to the extrusion orifice at a temperature above its melting point, e.g., a temperature of about 250° to 320° C.

The resulting molten filamentary material or film is passed in the direction of its length through a solidification or quench zone wherein it is transformed to a solid filamentary material or film.

The electron-poor (and, consequently, electron-accepting) monomers which can be used to crosslink the thus-prepared shaped structures can be any of a wide variety of ethylenically unsaturated compounds, included among which are ethylenically unsaturated lower aliphatic carboxylic acids and derivatives thereof (e.g., anhydrides, imides, cyanoesters and the like) such as maleic acid, fumaric acid, itaconic acid, maleic anhydride, chloromaleic anhydride, phenylmaleic anhydride, itaconic anhydride, maleimide, N-phenylmaleimide, 1,1-dicarbomethoxyethylene, vinylidene cyanide, cyanomaleates, cyanofumarates, 1,2-dicyanoethylene, unsaturated lactones, unsaturated lactams, and the like.

Shaped structures made from the crosslinkable linear, melt processable, thermotropic wholly aromatic polyesters of this invention can be crosslinked simply by contacting the shaped structure with one or more electron-poor crosslinking monomers in liquid form, i.e., as neat monomer or a solution of monomer in a suitable polar organic solvent therefor, such as alcohols, ethers, e.g., tetrahydrofuran, esters, dimethylformamide, dimethylsulfoxide, chlorinated hydrocarbons such as chlorobenzene, or the like, as well as mixtures thereof, or with monomer vapor, at temperatures ranging from about room temperature (about 25° C.) to temperatures below the softening point of the fabricated melt processable, crosslinkable, thermotropic, wholly aromatic polyester, and preferably from about room temperature to about 200° C., for anywhere from 6 to about 30 hours or longer, and preferably from about 10 to about 20 hours.

Amounts of electron-poor crosslinking monomer up to a stoichiometric amount, based on the amount of difunctional carbon-to-carbon double or triple bond-containing comonomer used to prepare the crosslinkable polyester, or amounts in excess thereof, can be employed.

Either before or after the crosslinking step, or in conjunction therewith, the shaped structure can be heat treated to enhance its physical properties, and particularly to increase its tenacity (tensile strength) and its softening or melting point. This thermal treatment can be conducted in a flowing inert atmosphere (using, for example, nitrogen, argon or helium), or in a flowing oxygen-containing atmosphere, e.g., a stream of air, with or without stress being applied to the shaped structure, at a temperature below the polymer's melting point, for from a few minutes to several days, until the desired property enhancement is achieved. As the shaped structure is thermally treated, its melting point is progressively raised. Staged or continuously-increasing temperatures may be employed, or the temperature can be held at a constant level throughout the thermal treatment. In the case of staged temperature increases, for example, the shaped structure can be heated initially for one hour at 200° C., and the temperature then raised stepwise in 10° C. increments in each succeeding hour until heating at 270° C. for one hour has been accomplished. Or, the shaped structure can, as indicated, be heated at a temperature about 15°–20° C. below the polymer's melting point for up to 48 hours. The particular thermal treatment conditions chosen will be governed in large measure by the nature of the polymer being treated.

Where desired, commonly-employed amounts of one or more known fillers (e.g., pigments, extenders, etc.), reinforcing agents, and the like, such as those disclosed in U.S. Pat. No. 4,067,852, issued Jan. 10, 1978 to Calundann and assigned to Celanese Corporation, can be employed.

In order that those skilled in the art can more fully understand the present invention, the following examples are set forth. These examples are given solely for purposes of illustration, and should not be considered as expressing limitations unless so set forth in the appended claims. All parts and percentages are by weight, unless otherwise stated.

EXAMPLE I

A. A linear, melt processable, crosslinkable, thermotropic, wholly aromatic polyester is prepared by first admixing 11.5 parts (50 mol %) of 6-acetoxy-2-naphthoic acid, 3.6 parts (20 mol %) of 4-acetoxybenzoic acid, 8.5 parts (30 mol %) of 4-acetoxy-4'-carboxystilbene and 0.015 part of potassium acetate catalyst in a 100 ml 3-neck flask fitted with a sealed glass paddle stirrer, an inert gas inlet tube and a heating tape-wrapped distillation head attached to a condenser. The flask is sparged with argon, and the reaction mixture is then heated, under a slow stream of argon, over a two hour period, with the reaction temperature increasing from 250° C. to 320° C. during the first hour and a half of that time and then being held at 320° C. for the last half hour, at which point the melt is quite viscous.

Initially, the melt is clear and straw colored, but acetic acid rapidly distills out and the melt first goes cloudly, then opaque.

The polymer is broken from the flask, ground in a Wiley mill, extracted with acetone for two hours in a Soxhlet apparatus to remove low molecular weight materials, and then dried in a forced hot air oven for one hour at 100° C.

The polymer is then supplied to a conical spinneret of the type commonly used to melt spin polyethylene terephthalate at a temperature 290° to 320° C. and melt spun to give a yarn having 20 continuous filaments. This yarn is then passed in the direction of its length through a quench zone to solidify the filaments.

B. An 0.05 gram sample of the as-spun fibers is immersed in an excess of molten maleic anhydride at 200° C. under an argon bath in a 100 ml flask fitted with a condenser, and held in an oil bath at 200° C. for 20 hours. After being removed from the maleic anhydride, the crosslinked fibers are cooled to room temperature, then extracted for six hours with acetone in a Soxhlet extracter, and then dried in air overnight at room temperature. The crosslinked fibers show an 18.3% weight increase.

C. The crosslinked fibers are then heat treated in air in an oven at 282° C. for 14 hours to further enhance their properties. A sample of the as-spun (uncrosslinked) fibers melts in the oven at this temperature. The crosslinked fiber does not dissolve in pentafluorophenol as do the as-spun and uncrosslinked heat-treated fibers.

EXAMPLES II–XXII

By repeating the procedures of Example I above in every respect but one, namely, replacing the monomers used in Example IA to prepare the wholly aromatic crosslinkable polyester with the following monomer mixtures:

| Example | ANA[1] | ABA[2] | ACS[3] | CAT[4] | DCS/DHQ[5] | DCT/DHQ[6] | DAT/TA[7] | DAS/TA[8] | ACA[9] | DCC/DHQ[10] |
|---|---|---|---|---|---|---|---|---|---|---|
| II | 80 | — | 20 | — | — | — | — | — | — | — |
| III | 20 | — | 80 | — | — | — | — | — | — | — |
| IV | 80 | — | — | 20 | — | — | — | — | — | — |
| V | 20 | — | — | 80 | — | — | — | — | — | — |
| VI | 80 | — | — | — | 20 | — | — | — | — | — |
| VII | 20 | — | — | — | 80 | — | — | — | — | — |
| VIII | 80 | — | — | — | — | 20 | — | — | — | — |
| IX | 20 | — | — | — | — | 80 | — | — | — | — |
| X | 80 | — | — | — | — | — | 20 | — | — | — |
| XI | 20 | — | — | — | — | — | 80 | — | — | — |
| XII | 80 | — | — | — | — | — | — | 20 | — | — |
| XIII | 20 | — | — | — | — | — | — | 80 | — | — |
| XIV | — | 80 | 20 | — | — | — | — | — | — | — |
| XV | — | 20 | — | 80 | — | — | — | — | — | — |
| XVI | 50 | 30 | — | 20 | — | — | — | — | — | — |
| XVII | 60 | 20 | — | 20 | — | — | — | — | — | — |
| XVIII | 60 | — | 40 | — | — | — | — | — | — | — |
| XIX | 80 | — | — | — | — | — | — | — | 20 | — |
| XX | 20 | — | — | — | — | — | — | — | 80 | — |
| XXI | 80 | — | — | — | — | — | — | — | — | 20 |
| XXII | 20 | — | — | — | — | — | — | — | — | 80 |

[1]6-Acetoxy-2-naphthoic acid; mol %
[2]4-Acetoxybenzoic acid; mol %.
[3]4-Acetoxy-4'-carboxystilbene; mol %.
[4]4-Acetoxy-4'-carboxytolan; mol %.
[5]Equimolar mixture of 4,4'-dicarboxystilbene and diacetoxyhydroquinone (e.g., in Example VI, 10 mol % DCS, 10 mol % DHQ, based on the total mols of polymerizable monomers present); mol %.
[6]Equimolar mixture of 4,4'-dicarboxytolan and diacetoxyhydroquinone; mol %.
[7]Equimolar mixture of 4,4'-diacetoxytolan and terephthalic acid; mol %.
[8]Equimolar mixture of 4,4'-diacetoxystilbene and terephthalic acid; mol %.
[9]4-Acetoxycinnamic acid.
[10]Equimolar mixture of 4-carboxycinnamic acid and diacetoxyhydroquinone.
[11]Diacetoxyhydroquinone=hydroquinone diacetate=1,4-diacetoxybenzene crosslinked fibers are obtained.

EXAMPLES XXIII–XXXVIII

By again repeating the procedures of Example I above in every respect but one, namely, replacing the monomers used in Example IA to prepare the wholly aromatic crosslinkable polyester with the following monomer mixtures:

| Example[1] | ANA/ABA | ACS | CAT | DCS/DHQ | DCT/DHQ | DAT/TA | DAS/TA | ACA | DCC/DHQ |
|---|---|---|---|---|---|---|---|---|---|
| XXIII | 98 | 2 | — | — | — | — | — | — | — |
| XXIV | 50 | 50 | — | — | — | — | — | — | — |
| XXV | 98 | — | 2 | — | — | — | — | — | — |
| XXVI | 50 | — | 50 | — | — | — | — | — | — |
| XXVII | 98 | — | — | 2 | — | — | — | — | — |
| XXVIII | 50 | — | — | 50 | — | — | — | — | — |
| XXIX | 98 | — | — | — | 2 | — | — | — | — |
| XXX | 50 | — | — | — | 50 | — | — | — | — |
| XXXI | 98 | — | — | — | — | 2 | — | — | — |
| XXXII | 50 | — | — | — | — | 50 | — | — | — |
| XXXIII | 98 | — | — | — | — | — | 2 | — | — |
| XXXIV | 50 | — | — | — | — | — | 50 | — | — |
| XXXV | 98 | — | — | — | — | — | — | 2 | — |
| XXXVI | 50 | — | — | — | — | — | — | 50 | — |
| XXXVII | 98 | — | — | — | — | — | — | — | 2 |
| XXXVIII | 50 | — | — | — | — | — | — | — | 50 |

[1]The letters ANA, ABA, ACS, CAT, DCS, DHQ, DCT, DAT, TA, DAS, ACA and DCC designate the same monomers as in Examples II–XXII. The numbers appearing under these designations are mol percentages. Where two monomers are listed together, they are present in equimolar amounts; e.g., in Example XXIII 49 mol % ANA, 49 mol % ABA, based on the total mols of polymerizable monomers present.

crosslinked fibers are obtained.

The above discussion and related illustrations of this invention are directed primarily to preferred embodiments and practices thereof. It will be readily apparent to those skilled in the art, however, that numerous changes and modifications in the actual implementation of the concepts described herein can readily be made without departing from the spirit and scope of the invention as defined by the following claims.

We claim:
1. A linear, melt processable, crosslinkable, thermotropic, wholly aromatic polyester comprising:
A. recurring structural units derived from at least about 1 mol %, based on the total aromatic dicarboxylic acid, aromatic diol and hydroxyaromatic acid content of said polyester, of at least one difunctional, carbon-to-carbon double or triple bond-containing unsaturated monomer represented by the general formulas:

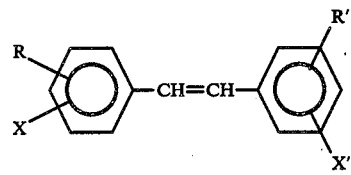

(I)

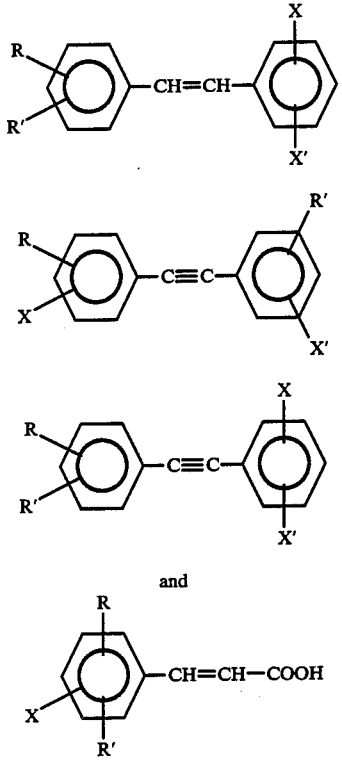

wherein X and X' can be the same or different substituents, and represent a hydroxyl group, a lower acyloxy group, a carboxyl group or an esterified carboxyl group, and R and R' can be the same or different non-interfering substituents, and B. At least one of the following recurring structural units:

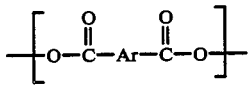 (VI)

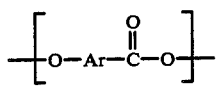 (VII)

and $$\left[\begin{array}{c} O \\ \| \\ O-Ar-C-O \end{array}\right]$$ (VIII)

wherein Ar represents an unsubstituted or substituted aromatic moiety.

2. A linear, melt processable, cross-linkable, thermotropic, wholly aromatic polyester as described in claim 1 wherein from about 2 mol % to about 80 mol % of the recurring structural units in said polyester, based on the total aromatic dicarboxylic acid, aromatic diol and hydroxyaromatic acid content of said polyester, are derived from at least one difunctional, carbon-to-carbon double or triple bond-containing monomer represented by the general formulas I–V, inclusive.

3. A linear, melt processable, cross-linkable, thermotropic, wholly aromatic polyester as described in claim 1 wherein from about 2 mol % to about 50 mol % of the recurring structural units in said polyester, based on the total aromatic dicarboxylic acid, aromatic diol and hydroxyaromatic acid content of said polyester, are derived from at least one difunctional, carbon-to-carbon double or triple bond-containing monomer represented by the general formulas I–V, inclusive.

4. A linear, melt processable, cross-linkable, thermotropic, wholly aromatic polyester as described in claim 3 wherein said difunctional, carbon-to-carbon double bond-containing monomer is a member selected from the group consisting of dicarboxystilbenes, dihydroxystilbenes, hydroxy-carboxystilbenes, and reactive derivatives thereof.

5. A linear, melt processable, cross-linkable, thermotropic, wholly aromatic polyester as described in claim 3 wherein said difunctional, carbon-to-carbon double bond-containing monomer is a dicarboxystilbene.

6. A linear, melt processable, cross-linkable, thermotropic, wholly aromatic polyester as described in claim 3 wherein said difunctional, carbon-to-carbon double bond-containing monomer is 4,4'-dicarboxystilbene or a reactive derivative thereof.

7. A linear, melt processable, cross-linkable, thermotropic, wholly aromatic polyester as described in claim 3 wherein said difunctional, carbon-to-carbon double bond-containing monomer is 4-acetoxy-4'-carboxystilbene.

8. A linear, melt processable, cross-linkable, thermotropic, wholly aromatic polyester as described in claim 3 wherein said difunctional, carbon-to-carbon triple bond-containing monomer is a member selected from the group consisting of dicarboxytolans, dihydroxytolans, hydroxy-carboxytolans, and reactive derivatives thereof.

9. A linear, melt processable, cross-linkable, thermotropic, wholly aromatic polyester as described in claim 3 wherein said difunctional, carbon-to-carbon triple bond-containing monomer is a dicarboxytolan.

10. A linear, melt processable, cross-linkable, thermotropic, wholly aromatic polyester as described in claim 3 wherein said difunctional, carbon-to-carbon triple bond-containing monomer is 4,4'-dicarboxytolan or a reactive derivative thereof.

11. A linear, melt processable, cross-linkable, thermotropic, wholly aromatic polyester as described in claim 3 wherein said difunctional, carbon-to-carbon triple bond-containing monomer is 4-acetoxy-4'-carboxytolan.

12. A linear, melt processable, cross-linkable, thermotropic, wholly aromatic polyester as described in claim 3 wherein said difunctional, carbon-to-carbon double bond-containing monomer is 3-hydroxycinnamic acid, 4-hydroxycinnamic acid, 3-carboxycinnamic acid, 4-carboxycinnamic acid or a reactive derivative thereof.

13. A linear, melt processable, crosslinkable, thermotropic, wholly aromatic polyester as described in claim 1 crosslinked with an electron-poor crosslinking monomer.

14. A linear, melt processable, crosslinkable, thermotropic, wholly aromatic polyester as described in claim 2 crosslinked with maleic anhydride.

15. A linear, melt processable, crosslinkable, thermotropic, wholly aromatic polyester as described in claim 3 crosslinked with maleic anhydride.

16. A linear, melt processable, crosslinkable, thermotropic, wholly aromatic polyester containing recurring structural units derived from 6-hydroxy-2-naphthoic acid or a reactive derivative thereof, 4-hydroxybenzoic acid or a reactive derivative thereof, or a mixture thereof, and from about 2 mol % to about 50 mol %, based on the total hydroxyaromatic acid and hydroxycarboxystilbene content of said polyester, of a hydroxycarboxystilbene or a reactive derivative thereof.

17. A linear, melt processable, crosslinkable, thermotropic, wholly aromatic polyester containing recurring structural units derived from 6-hydroxy-2-naphthoic acid or a reactive derivative thereof, 4-hydroxybenzoic acid or a reactive derivative thereof, or a mixture thereof, and from about 2 mol % to about 50 mol %, based on the total hydroxyaromatic acid and hydroxycarboxytolan content of said polyester, of a hydroxycarboxytolan or a reactive derivative thereof.

18. A linear, melt processable, crosslinkable, thermotropic, wholly aromatic polyester containing recurring structural units derived from 6-hydroxy-2-naphthoic acid or a reactive derivative thereof, 4-hydroxybenzoic acid or a reactive derivative thereof, or a mixture thereof, from about 2 mol % to about 50 mol %, based on the total hydroxyaromatic acid and hydroxycinnamic acid content, of a hydroxycinnamic acid or a reactive derivative thereof.

19. A linear, melt processable, crosslinkable, thermotropic, wholly aromatic polyester as described in any of claims 16, 17 or 18 crosslinked with maleic anhydride.

* * * * *